United States Patent [19]

Hawes

[11] 3,958,388
[45] May 25, 1976

[54] MODULAR BUILDING STRUCTURES

[76] Inventor: Turner C. Hawes, Box 162, Carpenteria, Calif. 93013

[22] Filed: Sept. 6, 1974

[21] Appl. No.: 503,605

[52] U.S. Cl. .................................. 52/584; 52/270; 52/586; 52/605; 52/615; 52/758 C
[51] Int. Cl.² .......................................... E04C 1/10
[58] Field of Search ................ 52/584, 758 C, 605, 52/265, 293, 615, 270, 586, 597, 621, 429, 424, 275

[56] References Cited

UNITED STATES PATENTS

| | | | |
|---|---|---|---|
| 2,808,624 | 10/1957 | Sullivan | 52/586 X |
| 3,091,487 | 5/1963 | Gallagher et al. | 52/584 X |
| 3,160,249 | 12/1964 | Pavlecka | 52/586 |
| 3,443,347 | 5/1969 | Varnell et al. | 52/429 X |
| 3,690,077 | 9/1972 | Dalgliesh, Jr. et al. | 52/584 X |

FOREIGN PATENTS OR APPLICATIONS 479,792 11/1969 Switzerland .......................... 52/584

Primary Examiner—Ernest R. Purser
Assistant Examiner—Carl D. Friedman
Attorney, Agent, or Firm—Huebner & Worrel

[57] ABSTRACT

A construction member having two side wall faces and an adjacent end face, one of the faces having a trough extending therein, a ramp for gripping by a clamp, functioning as a dovetail mortise, formed adjacent the trough bottom and extending along a wall of the trough, and a protrusion with respect to the trough bottom formed of a trough wall, a portion of said one face, another face and the ramp, the protrusion and the trough having the configuration of a modified half dovetail tenon rail.

A construction member being an assembly of two juxtaposed panels, each panel having side faces as opposite wall surfaces and end faces forming the peripheral edge of the two panels, each end face forming the peripheral edge having a modified half dovetail tenon rail, the two rails being in an allochiral relationship and forming a substantially full dovetail tenon rail, and clamps, functioning as dovetail mortises, having gripping ends in engagement with respective tenon rails in each panel securing the two panels together.

12 Claims, 29 Drawing Figures

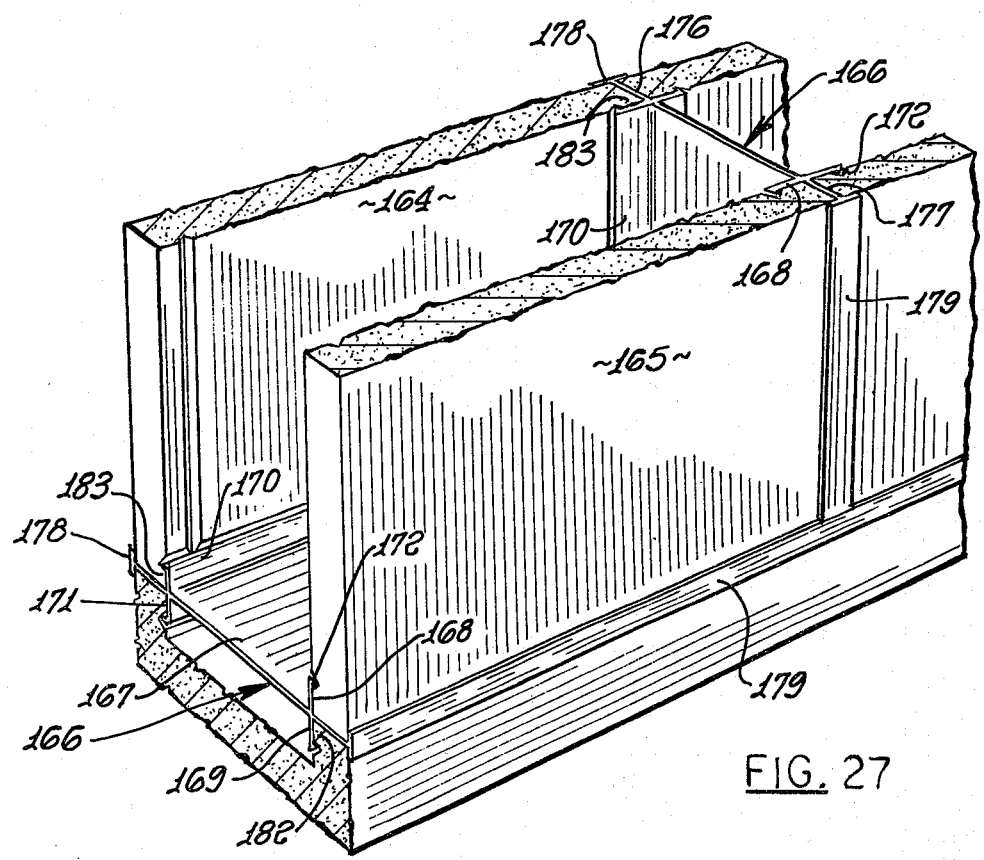
FIG. 27
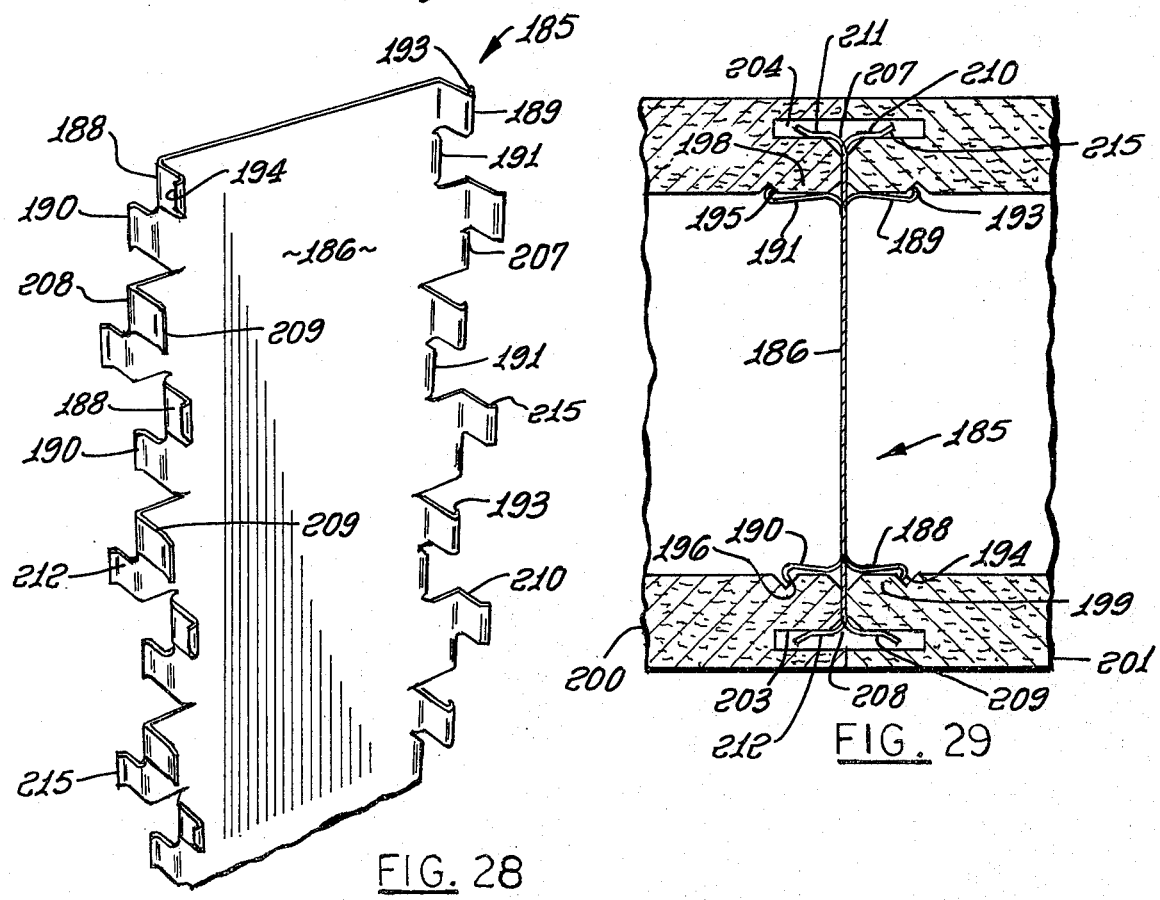
FIG. 28
FIG. 29

MODULAR BUILDING STRUCTURES

BACKGROUND OF THE INVENTION

The invention relates to elements for forming modular parts for building structures and means for securing the structures together, the structures and the means being standardized for use in many types of buildings. Modular construction has long been recognized as desirable for efficient building, but with the exception of some standardization in the size and shape of component parts, such as concrete blocks, for example, true modular construction is not used extensively. It is generally not possible to purchase standardized parts in the form of readily assembled modular members and joining elements to construct buildings of a variety of designs. The present invention provides such modular members and joining elements which can be used in a variety of designs.

Applicant is aware of the following prior art patents: U.S. Pat. Nos. 2,228,363 2,808,624 3,490,800 3,512,819 3,729,889, 3,771,277.

SUMMARY OF THE INVENTION

The invention is comprised of modular building structure elements and means to join the elements together for use in many different types of building designs.

Accordingly, it is an object of the invention to provide improved modular building structure elements.

It is another object of the invention to provide design shapes and a modular dimension system for a group of construction members which can meet the requirements for a major part of the structure of building and be standardized to fit many buillding designs.

It is still another object of the invention to provide construction members that can be produced economically by mass production methods and from a wide variety of materials, including those of lowest cost and those whose use will be least detrimental ecologically.

It is a further object of the invention to provide construction members that can be readily and economically erected and assembled into a building structure with a minimum of labor, skills and special equipment. To accomplish this, the design of the individual members can be made so that their weight will not exceed the capacity of one person.

It is a still further object of the invention to provide simple, economical devices for joining the construction members. The devices are clamps functioning as dovetail mortises.

It is another object of the invention to provide construction elements that will produce building structures that are sound and of good quality. Elements according to the invention can be made to be airtight, to permit low heat transfer, and to resist moisture, fire, wind and earthquake damage.

Further objects and advantages of the invention may be brought out in the following part of the specification wherein small details may be described for the competence of disclosure without intending to limit the scope of the invention which is set forth in the appended claims.

BRIEF DESCRIPTION OF THE DRAWINGS

Referring to the accompanying drawings, which are for illustrative purposes:

FIG. 27 is a broken perspective view of a lower part of a section of wall assembly wherein panels of unthickened edges are joined by modified form of the clamps shown in FIG. 6 and FIG. 26, the clamp concealing the edges of the panels;

FIG. 28 is a perspective view of a modified version of the clamp shown in FIG. 27; and FIG. 29 is a fragmentary cross-sectional view of a joint for panels having unthickened edges and in which the clamp is hidden.

DESCRIPTION OF THE PREFERRED EMBODIMENTS

Figure 1:
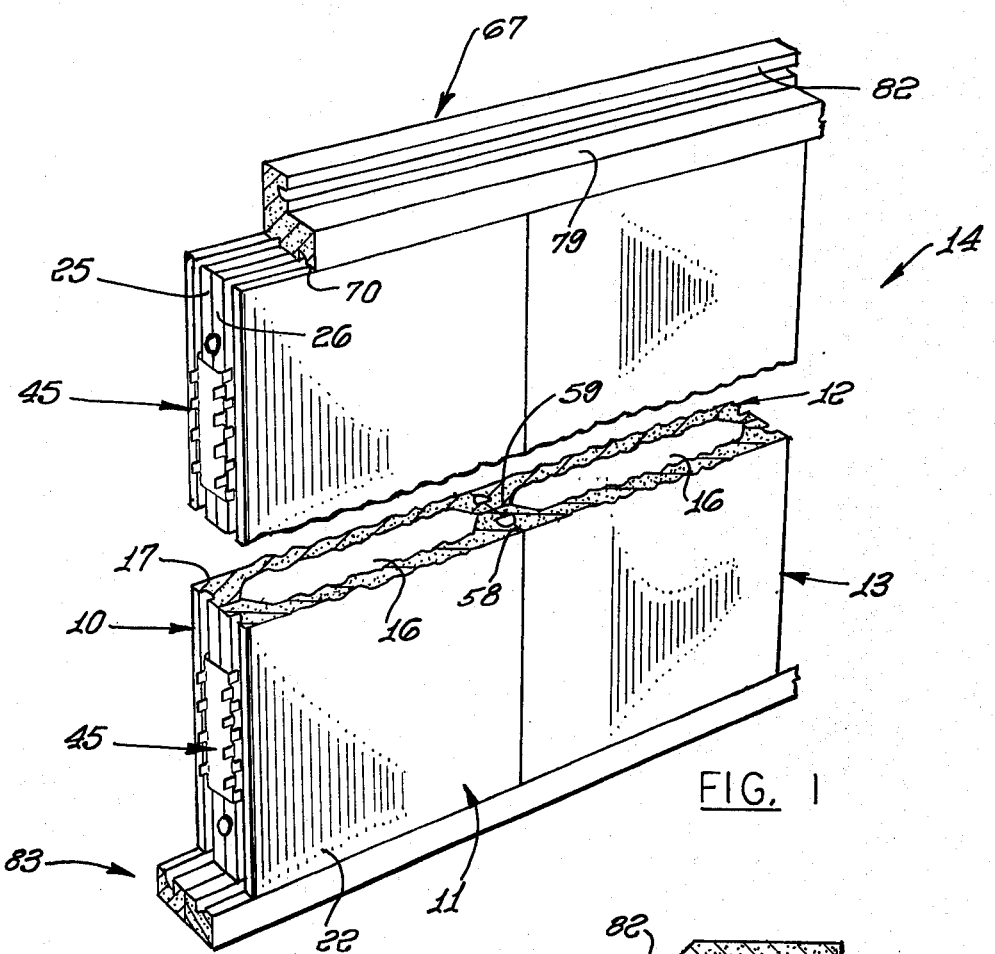
FIG. 1 is a perspective view of a wall assembly, including pairs of modular panels and other construction members, and clamping means to hold the panels together.
Figure 2:
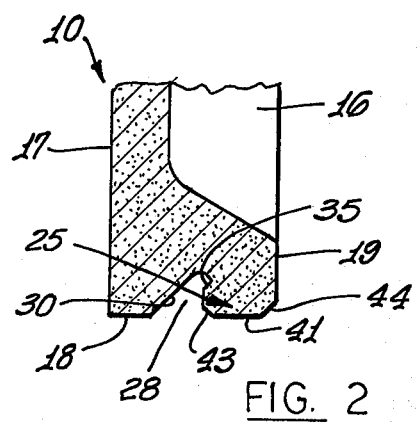
FIG. 2 is a fragmentary cross sectional view of a panel end, illustrating a joining element.
Figure 8:
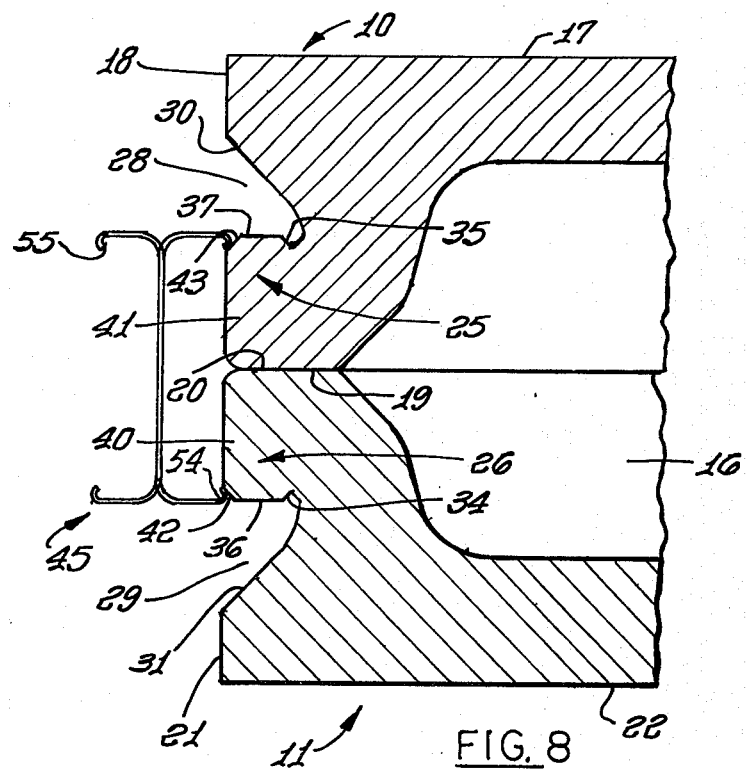
FIG. 8 is an enlarged fragmentary cross-sectional plan view of a pair of panel members and a clamp in a position to be snapped on to joint edge elements in the edges of the panels.
Figure 7:
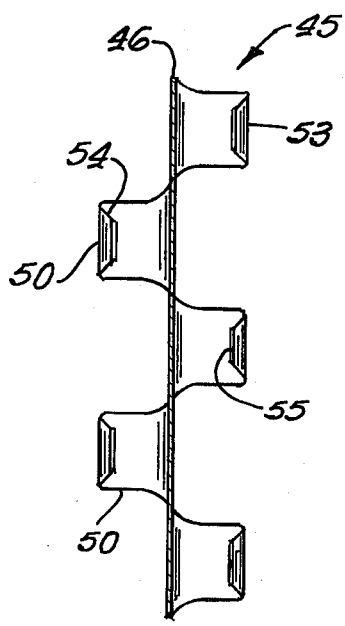
FIG. 7 is a fragmentary side elevational view of the clamp, taken along the line 7-7 in FIG. 6.

Referring again to the drawings, in FIGS. 1–9, there are shown various construction elements according to the invention. In FIG. 1 there are four panel members, generally designated as 10, 11, 12 and 13, having lightening spaces as 16, secured together to form a hollow sandwiched wall section 14. Each of the panels has two side wall faces and an edge face spaced therebetween. This structure is best seen in FIG. 8 where the panel member 10 has an outside face 17, an edge face 18 and an inside face 19. Similarly, the adjoined panel 11 has an inside face 20, an edge face 21 and an outside face 22. In the edge faces there are formed rails 25 and 26 which extend around the entire peripheral edge of the panels. Each of the rails is in the form of a modified half dovetail tenon rail and together in the allochiral relationship shown form substantially one full dovetail tenon rail.

The respective rails are formed by cutting longitudinally directed grooves or troughs 28 and 29 into the edges. The troughs 28 and 29 have respective surfaces 30 and 31 at angles with the edge faces 21 and 18, terminating in clamp gripping or locking ramps 34 and 35 formed in an undercut or recess at the rail base. Extending outwardly from the ramps 34 and 35 are rail wall surfaces 36 and 37, substantially perpendicular to or at an obtuse angle to edge rail surfaces 40 and 41. Adjoining rail surfaces 36, 40 and 37, 41 are clamp entry ramps 42 and 43 formed by cutting off the corners of the rail.

With respect to the trough bottom each of the rails form a protrusion which when the panel faces 19 and 20 are in abutment they form a single rail which in cross section or in end view have the appearance of a modified dovetail tenon rail.

The panel members in FIGS. 1 and 8 are held together at the edges by a plurality of clamps, generally designated as 45, also shown in FIGS. 3, 5, 6 and 7. In cross section or end view the clamps have the appearance of two back-to-back channels having one bottom or web 46, and extending in one direction from opposite edges 47 and 48 of the web are a plurality of pairs of opposing resilient legs 49 and 50. Spaced alternately, longitudinally with the legs 49 and 50 are a plurality of pairs of opposing resilient legs 52 and 53 extending in the opposite direction. Each of the legs adjacent their outer ends have an entry ramp 54. The entry ramp is formed of an inwardly turning lip terminating in an inner edge 55, defining a gripping end adapted to grippingly engage the gripping ramps 34 and 35 of the tenon rails.

Referring to FIG. 8, when the clamps 45 are moved onto the abutting rails 25 and 26, the resilient legs are moved laterally outwardly as the ramps 54 on the legs slide over the entry ramps 42 and 43 on the rails and as the clamps are moved farther on and the webs 46 of the clamps near contact with the outer edge face of the rail, spring stresses cause the gripping ends 55 of the legs to close on the gripping or locking ramps 34 and 35. The angle of the ramps is such as to take up any looseness which might occur due to manufacturing tolerances. The number of clamps required is determined by stability achieved as the panels are sandwiched.

The panels, such as 10 and 11, may have any one of various edge configurations provided that they have rails, as 25 or 26. The panel as shown in detail in FIG. 2 has a thickened edge comprising the joining or modified half dovetail tenon rail 25, the trough or groove 28, entry ramps 43 and 44, locking ramp 35, and the other portion of the end face 18 which forms an abutment rail. The outer surface 41 of the dovetail rail and the outer surface 18, forming the panel edge surfaces, are in the same plane, and space, equal in thickness to the web 46 of the clamp, is allowed for use of seals or a sealant material to be applied on the end faces 18 of two joined panels.

Figure 9:
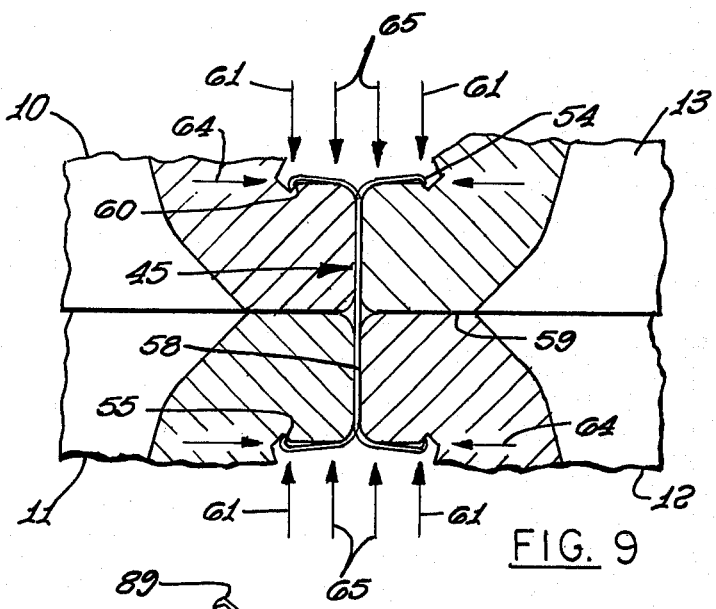
FIG. 9 is a fragmentary cross-sectional view, illustrating four panel members being joined by a clamp.

The four panel members 10, 11, 12 and 13 are also joined by centrally positioned, hidden clamps along the edges at 58 and 59. In FIG. 9 the clamp 45, and its operation as a dovetail mortise, joining the panel members are shown in detail. The clamp is engaged with four joining rails, similar to those shown in FIG. 8 with the leg ends or claws on the gripping or locking ramps 60. The clamp and ramps 60 have a self-tightening feature according to the invention; that is, the length of the ramp provides a tolerance for gripping. Thus, if the ramp length is 1/16 in., the tolerance is about 1/16 in., and if the clamp length is short, it grips higher on the ramp 60.

The spring force 61 acts against the locking ramps to produce resultant forces 64 restraining the separation of the joint. The shortness of the claw defined by ramp 54 and the returned end 55 provides a short lever arm providing great resistance against unbending. The arrows 65 indicate a restraint close to the clamp web and it holds the panels together and supplies adequate control of alignment between the side faces and the dovetail rails, and through these provides control of the alignment of the exposed wall faces.

Figure 4:
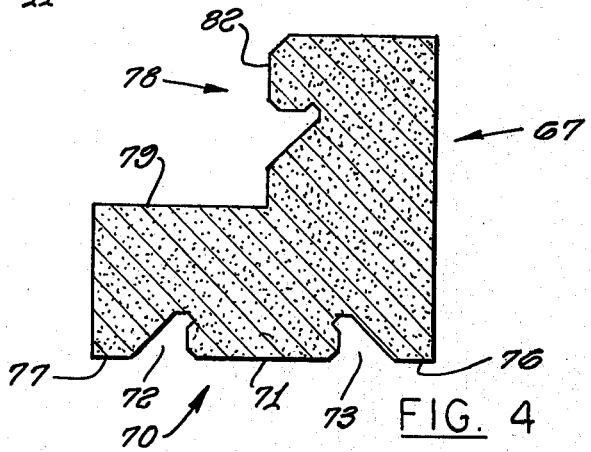
FIG. 4 is a cross-sectional end view of an L-shaped top plate for use on the top of wall panels, as shown in FIG. 1.
Figure 3:
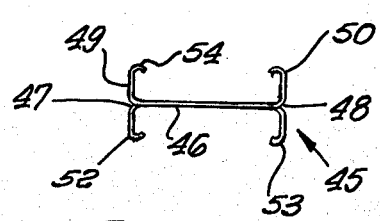
FIG. 3 is an end view of a clamp for joining modular construction elements together.

In FIGS. 1 and 4 there is shown the plate member, generally designated as 67, and it is joined to the top of the sandwich wall 14 by means of clamps 45 to provide structural alignment and as a means of attaching ceiling and roof members. The plate member is L-shaped having a bottom face 70 of the bottom leg of the L, of the same width as the upper edge of the sandwich panel formed by the members 10 and 12. The bottom face 70 has a full modified dovetail rail 71 with grooves 72 and 73 spacing the rail from the end surfaces 76 and 77. The rail 71 is of the same size as the combined half rails 25 and 26 and clamps 45 engage the rail 71 in the same manner as they engage the rails 25 and 26.

The upper leg of the L has a face 78 half the width of the lower leg leaving a top surface 79 of the lower leg as a seat for panels used in forming the ceiling. The inner face 78 has a modified half dovetail rail 82 adapted to be clamped to the ceiling panels.

Figure 5:
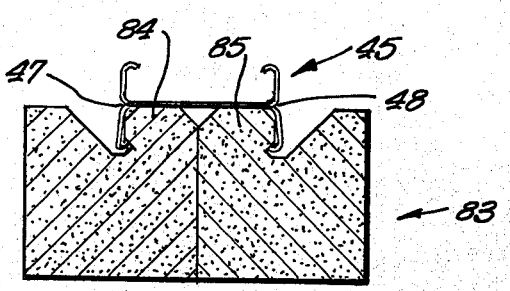
FIG. 5 is a cross-sectional end view of a pair of sill members secured together by a clamp.
Figure 6:
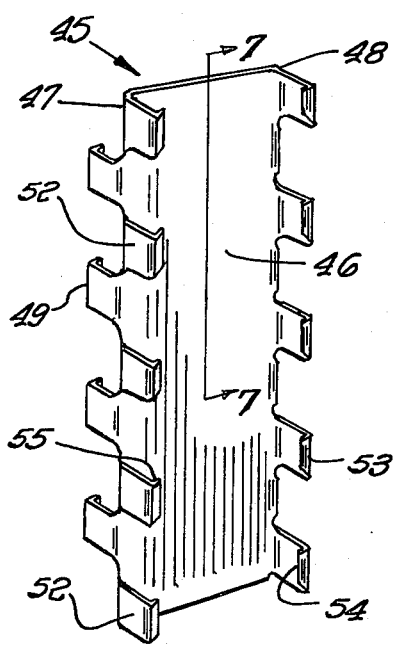
FIG. 6 is a perspective view of the clamp shown in FIG. 3.

In FIGS. 1 and 5 there is shown a sill assembly 83, the sill being engaged in supporting relationship at the bottom of the four panels to provide structural rigidity for the bottom edge of the wall 14 and a means of attaching the wall to the floor. The sill has two joined rails 84 and 85 which are the same size as the rails 25 and 26 in the panel members. By making the sill in two halves, provision is made for staggering the ends of the halves for continuous rigidity over the length of a long wall and facilitates installation of plumbing, for example.

Figure 10:
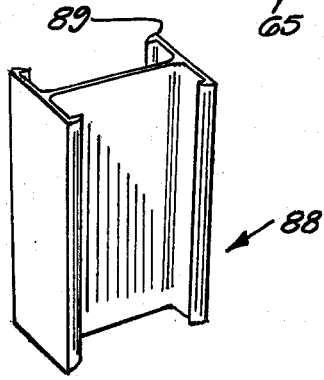
FIG. 10 is a perspective view of a modified form of the clamp shown in FIG. 6.

In FIG. 10 there is shown a modified clamp 88 which may be formed by extrusion and is similar to the clamp 45, except that its legs 89 are continuous.

Figure 11:
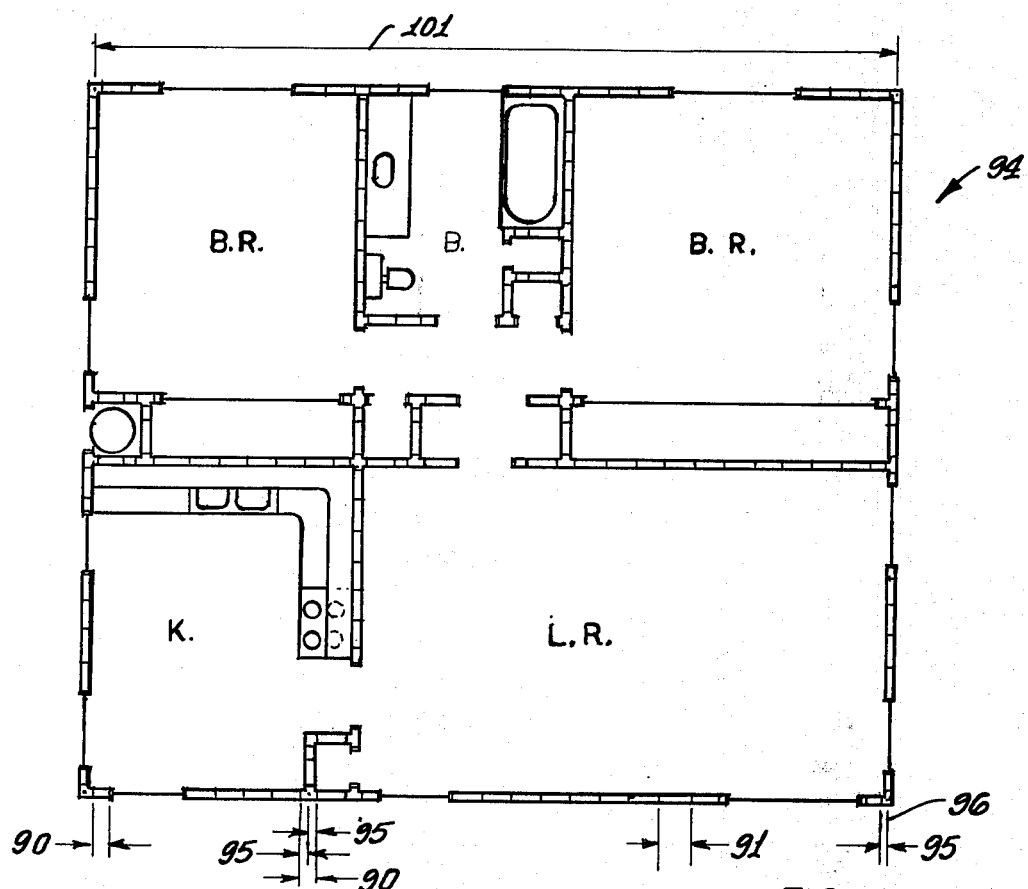
FIG. 11 is a plan view of walls of a dwelling incorporating modular construction members according to the invention.

In FIG. 11 there is shown a plan view of a house, generally designated as 94, adapted to be built using construction members as shown in FIGS. 1–10 and the modular system of the invention. Here, the wall panel sandwich assemblies, such as 14, have one or more widths, the narrower being 90, and this panel size may be considered to be a basic module, width 91 of the wider panels being an even multiple of the width 90 of the basic module. Each intersection of the walls has an effective length 95 of a wall equal to half the basic module 90. Because each wall of the room is intersected by two other walls, the sum of two half modules 95 of the wall length contained in two intersecting members is equal to one basic module width 90. The length of the wall indicated 95 in any intersection is measured from a center plane 96 of the intersecting wall.

Figure 12:
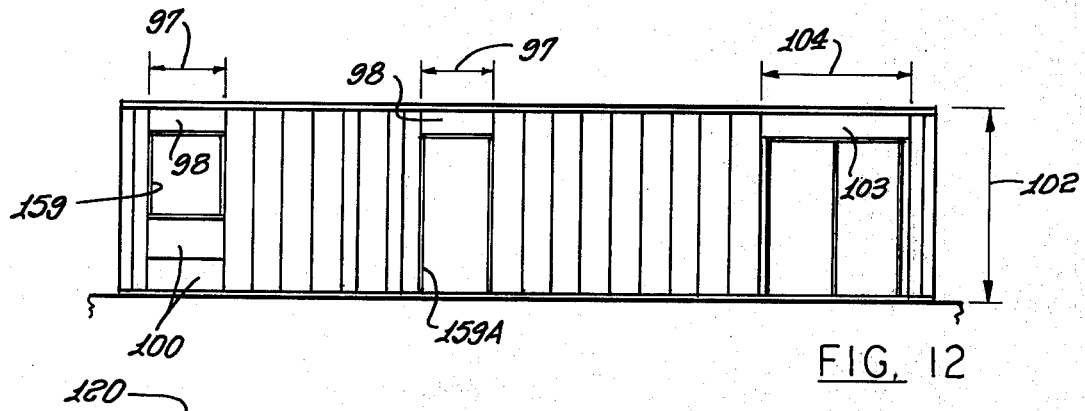
FIG. 12 is a front elevation of a wall of the dwelling shown in FIG. 11.

In FIG. 12, an elevational view of the lower wall in FIG. 11, the lengths 97 and 104 of panels used horizontally as lintels 98 and 103, respectively, over wall openings, as well as corresponding filler panels 100 under the windows, are also equally divisible by the basic modular dimension. The result of these various provisions is control of the overall length 101, shown at top of FIG. 11, to match that of an opposite wall without having to use any specially made fillers. The basic module 94 may also be evenly divisible into the lengths 102 of panels used vertically. This permits the use of the same panels in ceiling and roof. Facing members 159 and 159A are shown in end view in FIGS. 20 and 21.

Figure 13:
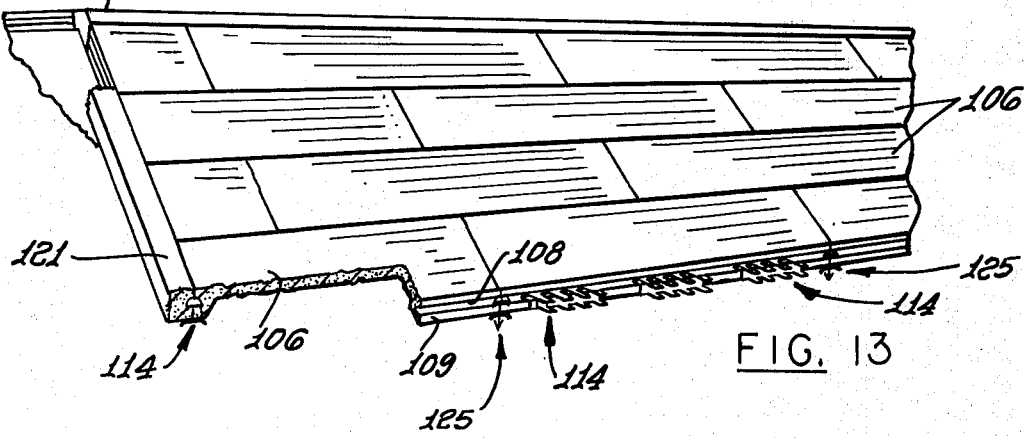
FIG. 13 is a perspective view of a roof constructed of elements according to the present invention.
Figure 25:
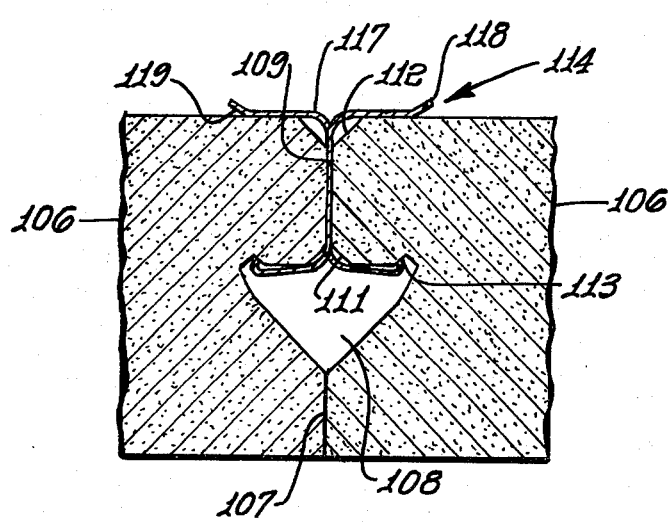
FIG. 25 is a cross-sectional end view of a clamp fitted on a joint and attaching the long edges of single panels to each other.
Figure 26:
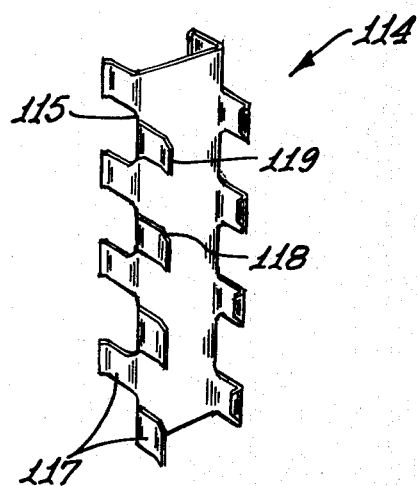
FIG. 26 is a perspective view of the clamp shown in FIG. 25.

In FIG. 13 a roof is formed of panels having modified half dovetail rails at their joining edges. Shown in detail in FIG. 25, panel members 106 have an end edge 107 formed of a groove or trough 108, rail surface 109, entry ramps 111 and 112, and locking ramp 113. The panels are secured together along their long edges by channel-shaped clamps 114, also shown in FIG. 26, which differ from clamps 45 in that the resilient legs 117 extending from one of the opposite edges 115 of the web have adjacent their outer ends 118 an entry ramp 119 formed by a bend causing the outer ends 118 to be directed laterally outwardly from the clamp web.

A roof ridge member 120, shown in FIG. 13, and a trim member 121 have the same joint elements as the single panels and are joined to the panel edges by clamps 114.

Figure 22:
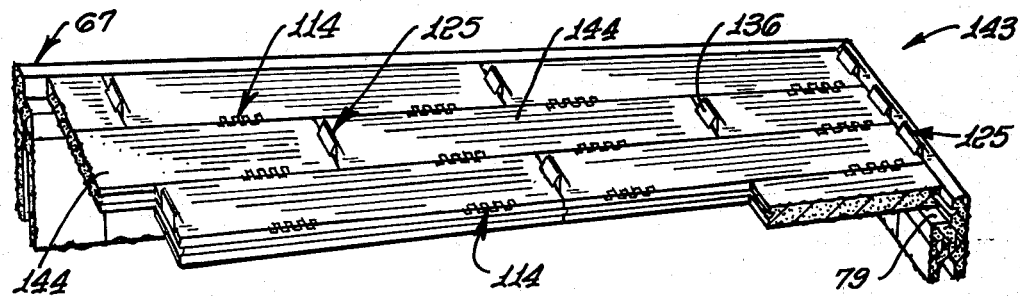
FIG. 22 is a fragmentary perspective view of an arrangement of panels forming a ceiling, illustrating its relation to wall panels and an L-shaped wall plate shown in FIG. 4.
Figure 23:
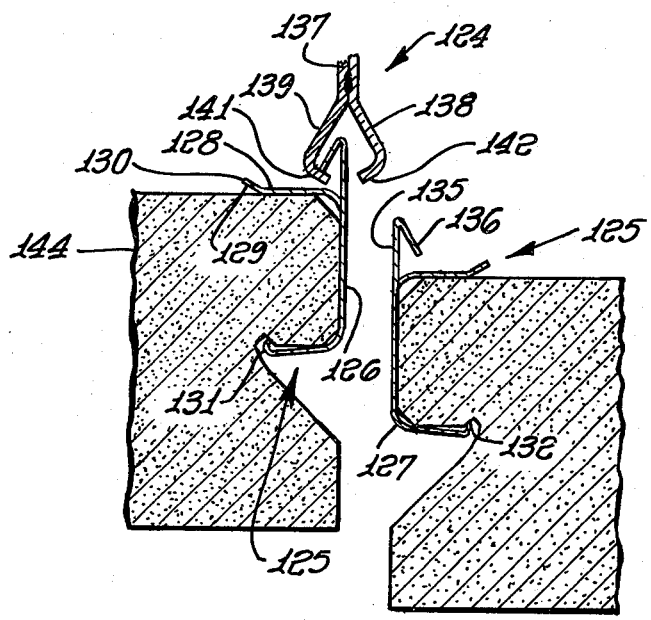
FIG. 23 is an expanded view in cross section of a pair of clamps and panel members for attachment to a support member.

As shown in FIGS. 22 and 23, panel members 106 can be attached by clamps 125 at their ends to the top edges of alternate trusses 124, the top edges having the same attachment elements as those shown on their bottom edges for the support of ceiling panels 144.

Figure 24:
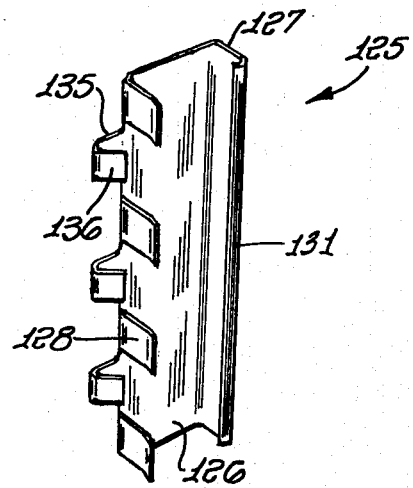
FIG. 24 is a perspective view of a clamp of the type shown in FIG. 23.

Shown in FIGS. 23 and 24, the clamps 125 are designed to hold each abutting panel separately but not to provide restraint from separation of the panel ends from each other. This facilitates installation and also provides a safety factor in that under catastrophic conditions it permits some shift of the panels without losing the truss engagement. The clamp 125 has a central web 126, a resilient continuous leg 127 at one edge of the web and at the opposite edge has spaced resilient legs 128, having outward bends 129 adjacent their ends 130, forming an entry ramp for engaging the rail. As in the other clamps, the opposing legs 127 and 128 are generally parallel and approximately perpendicular to the web. The leg 127 has a claw 131 engaging the rail locking ramps 132. Spaced between the legs 127 are fingers 135 extending laterally outwardly in the plane of the web and having adjacent their ends a hook 136 having its returning end extending inwardly toward the clamp.

In FIG. 23 the truss 124 has an upwardly extending portion 137 and downwardly therefrom extends two legs 138 and 139 forming a V having inwardly and downwardly directed end portions 141 and 142. At the upper end of the truss member, not shown, there is a similar V-shaped member for engagement with clamps 125, engaged with roof panels, for example, having their hooks 136 extended in position to be snapped into the V between the end portions 141 and 142 in the same way as they are adapted to be snapped into the same structure in FIG. 23 as the rails are moved so that clamp webs are in abutment. The V opening has a width less than the unrestrained spread of the hooks 136 to prevent disengagaement, the ends of the hooks being engaged with the inner surfaces of the end portions 141 and 142 of the V legs. Spring pressure of the hooks causes the legs 128 to tighten on the rail as the hooks tend to open within the truss member and the hook ends tend to move outwardly toward the legs 138 and 139.

In FIG. 22 a ceiling 143 is shown formed of panel members 144, each having the same kind of a single rail end joint as panels 106 in the roof shown in FIG. 13, and being held together by means of clamps 114 at the side edges of the panels. The outer edge of the ceiling is supported on a plate member 67, as shown in FIGS. 1 and 4, the panels members being secured to the plate member by means of clamps 114. The ceiling along its margin rests on the surface 79 of the plate member. Clamps 125 are shown having their hooks 136 extending upwardly from the ceiling for engagement with trusses 124.

Figure 14:
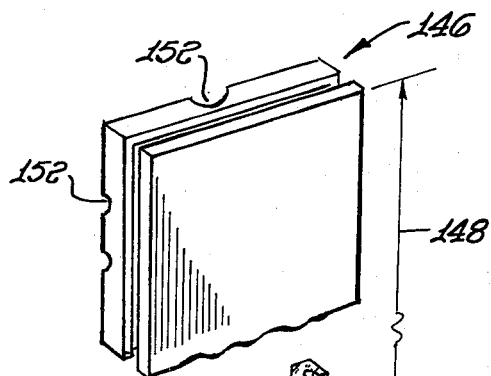
FIG. 14 is a perspective view of a panel according to the invention, having modular dimensions.

In FIG. 14 there is shown a panel member 146 having a continuous single or half modified dovetail rail 147. The panel may be made as a single unit of a castable or moldable material with the half dovetail rail integral therewith. It may also be made of other types of materials and as an assembly of various details. The panel has a length 148 and a width 149 both of which are divisible by the basic module dimension 90. Shown in the edges are cutouts 152 to facilitate electrical and plumbing installations. Where necessary for ease of erection, the width may be controlled within the limitations of the modular system to control weight.

Figure 16:
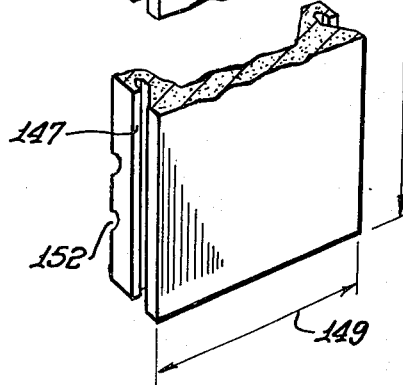
FIG. 16 is a cross-sectional plan view of an inner corner member of the assembly illustrated in FIG. 15.
Figure 15:
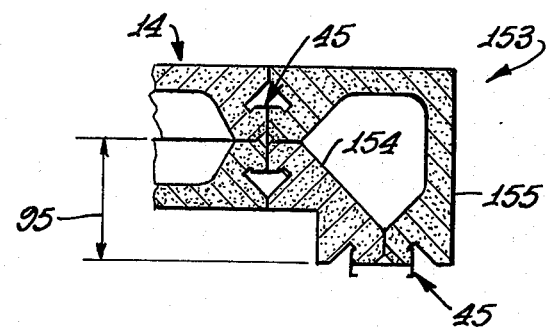
FIG. 15 is a fragmentary cross-sectional plan view of a corner assembly for the intersection of two walls.
Figure 17:
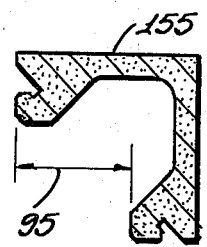
FIG. 17 is a cross-sectional plan view of the outer corner member illustrated in FIG. 15.

In FIGS. 15–17 there is a corner assembly, generally designated as 153, having an inner corner member 154 and an outer corner member 155. Both are generally L-shaped and have on the end faces of its legs half dovetail edge joint elements, as shown on the panel member in FIG. 2. The members 154 and 155 are secured together by means of a clamp 45 and at the left the two corner forming members are secured to a sandwiched panel section 14, as shown in FIG. 1, by means of the same type of clamp.

Each of the members has the half module dimension 95 from the abutting contact face of one leg to the end face of its other leg. The members have relieved areas to reduce the weight and material required. These corner members have the same vertical length 102 as the vertical wall panels, shown in FIG. 12.

Figure 18:
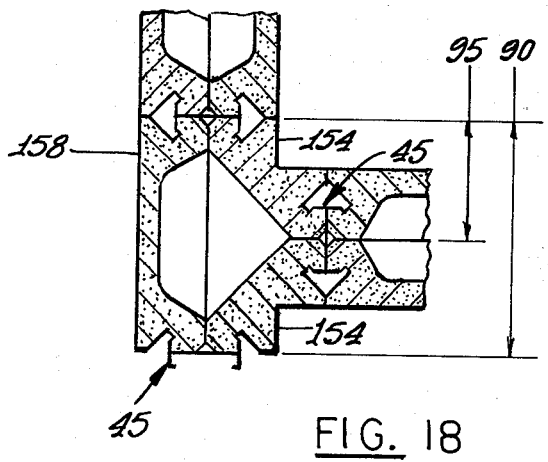
FIG. 18 is a cross-sectional plan view of an assembly of corner members for the intersection of three walls.

In FIG. 18 there is shown a corner for the intersection of three walls formed, by combining two inner corner members 154 to a panel 158 of the same shape as the panel 10 in FIG. 1 but having a width 90 of one module. This maintains the half module effective length 95 of the wall in each leg of the corner assembly. Here, again, the individual members are secured together by clamps 45.

Figure 19:
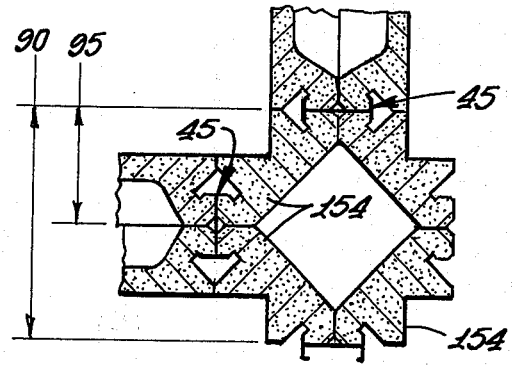
FIG. 19 is a cross-sectional plan view of an assembly of corner members for the intersection of four walls.

In FIG. 19 there is shown an intersection of four walls comprised of four inner corners 154, each leg of this corner assembly having an effective wall length 95 of a half module, and the length of the corner members is that of the basic module 90. Again, all the members are secured together by clamps 45.

Figure 20:
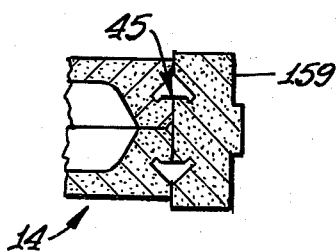
FIG. 20 is a fragmentary cross-sectional plan view of a pair of panels joined to a facing member for wall openings.

In FIG. 20 a panel sandwich 14 is joined to a facing member 159, having one full face with full male dovetail joint elements by which it is joined with clamps 45 to the edges of panel sandwiches 14 around the window openings and at the top and sides of door openings, shown in place in FIG. 12, as 159 and 159A. In narrow openings with lintels having a short span the facing members 159 provide vertical support for the lintels 98, as shown in FIG. 12.

Figure 21:
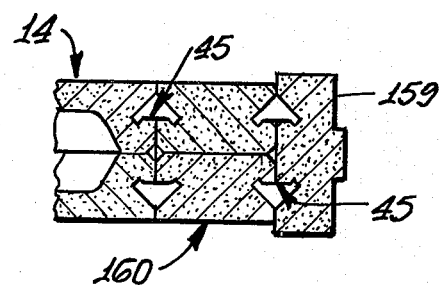
FIG. 21 is a fragmentary cross-sectional plan view of a pair of panels joined to a lintel support member which is joined to a facing member.

As shown in FIGS. 12 and 21, for wide door openings where the lintel span, as 103, is great, extra support is provided by an extra sandwich assembly 160 positioned between the facing member 159 and the wall panels 14, all joined with clamps 45.

The structural relationships and the specific structures shown in FIGS. 14 through 21 clearly illustrate the design shapes and modular dimension system for a group of construction members which, according to the invention, meet the requirements for a major part of the structure of buildings, the members being standardized to fit many building designs.

In FIG. 27, there is shown a method of construction wherein two opposite face members 164 and 165 of a wall are held in a fixed separate relationship by clamps 166. In cross section the clamps have two back-to-back channels formed on one web 167, and extending from one edge of the web are resilient legs 168 and 169, and at the corresponding opposite edge are resilient legs 170 and 171. The legs have gripping claws 172 having their ends extending laterally away from the leg but inwardly toward the plane of the web. Extending outwardly in the plane of the web from its opposite edges are extended web members 176 and 177. At the outer ends of members 176 and 177 are flanges 178 and 179, perpendicular thereto and extending laterally on both sides thereof. These flanges conceal the outer face edges of panels or other construction members being joined together. The claws on the ends of the legs 168, 169, and 170, 171 are in gripping engagement with two abutting half dovetail rails indicated at 182 and 183, the half dovetail rails being of the same structure as that shown in FIG. 2.

In FIGS. 28 and 29 there is shown a clamp, generally designated as 185, having a web 186, and at opposite edges thereof having a plurality of pairs of opposing resilient, generally parallel legs 188 and 189, spaced longitudinally on the web edges. Spaced longitudinally from legs 188 and 189 are a plurality of pairs of opposing, generally parallel resilient legs 190 and 191. The legs 188, 189, 190 and 191 have claw ends as at 193 and 194 in gripping engagement with locking ramps as at 195 and 196 formed on half modified dovetail tenon rails 198 and 199 formed on the edges of panels as 200 and 201. An outer face 203 of the rails is formed in a groove 204 cut into the edge of the panels.

Spaced longitudinally from legs 188, 189, 190, 191 are outermost web edges 207 and 208. Extending from the edges 207 and 208 are a plurality of pairs of opposing resilient, generally parallel legs 209 and 210 extending in one direction from the web, and spaced longitudinally therewith extending in the other direction are a plurality of pairs of opposing resilient, generally parallel legs 211 and 212. Each of the legs 209, 210, 211 and 212 have a bend as at 215 forming an entry ramp adjacent the ends, the ends extending laterally outwardly from the bend. These legs are in gripping engagement with the rail surfaces within the grooves 204, as at 203. This type of clamp has its outer legs concealed by the panel structure outwardly of the grooves 204.

The invention and its attendant advantages will be understood from the foregoing description, and it will be apparent that various changes can be made in the form, construction and arrangement of the parts of the invention without departing from the spirit and scope thereof or sacrificing its material advantages, the arrangements hereinbefore described being merely by way of example. I do not wish to be restricted to the specific forms or uses mentioned except as in the accompanying claims wherein various portions have been separated for clarity of reading and not for emphasis.

I claim:

1. A structural assembly comprising:

two structural members joined together in end-to-end relationship by at least one clamp, each member having a side face, an end face and a third face, said end face extending between said side face and said third face, said third face being opposite said side face, a longitudinal groove in said third face adjacent said end face, a wall of said groove nearest the end face defining a gripping ramp for said clamp, an entrance ramp in each member adjoining the end face and the third face, said members having in allochiral relationship, said clamp having a web having two back-to-back faces, a plurality of pairs of resilient opposing first side legs extending from opposite edges of said web in one direction, said pair of first legs and said web defining first channels in cross section, a plurality of pairs of resilient opposing second side legs extending from opposite edges of said web in an opposite direction to said one direction, each pair of second side legs and said web defining second channels in cross section, said first and second legs extending from one of said opposite edges each having a returning lip adjacent its outer end, each lip having a curved outer face and an edge directed toward said web, and one face of said web being in contact with said end face of one of said members and the other face of said web being in contact with said end face of the other of said members, said first and second legs extending from said one opposite edge of said web extending along said third face, said edges of said lips being in gripping contact with said respective gripping ramps, said first and second legs extending from the other of said opposite edges of said web being in gripping contact with said respective side faces.

2. The invention according to claim 1 in which:

said first and second legs extending from the other of said opposite edges of said web have adjacent their outer ends a laterally outwardly bend forming a ramp for entry onto said last respective side faces.

3. The invention according to claim 1 in which:
an entry ramp adjoins each of said respective side faces and said end faces.

4. A structural assembly comprising:
two structural members joined together in end-to-end relationship by at least one clamp,
each member having first and second side faces and an end face extending therebetween,
each of said end faces having a longitudinally extending groove therein,
an entrance ramp in each member adjoining the end face and one wall of the groove, said first side faces and said one groove walls being respectively aligned,
a gripping ramp formed at the inner end of each of the grooves, said gripping ramp extending from said one groove wall in a direction away from the remainder of the groove,
said clamp having a web having two back-to-back faces, a plurality of pairs of resilient opposing first side legs extending from opposite edges of said web in one direction, each pair of first legs and said web defining first channels in cross section,
a plurality of pairs of resilient opposing second side legs extending from opposite edges of said web in an opposite direction to said one direction, each pair of second legs and said web defining second channels in cross section,
said first and second legs extending from one of said opposite edges each having a returning lip adjacent its outer end,
each lip having a curved outer face and an edge directed toward said web, and
one face of said web being in contact with said end face between said first side face and said entrance ramp at said one groove wall of one of said members and the other face of said web being in contact with said end face between said first side face and said entrance ramp at said groove wall of the other of said members,
said first and second legs extending from said one opposite edge of said web extending along said one wall of said respective grooves, said edges of said lips being in gripping contact with said respective gripping ramps,
said first and second legs extending from the other of said opposite edges of said web being in gripping contact with said respective first side faces of said members.

5. The invention according to claim 4 in which:
said first and second legs extending from the other of said opposite edges of said web have adjacent their outer ends a laterally outwardly bend forming a ramp for entry onto said respective first side faces.

6. The invention according to claim 4 in which:
an entry ramp adjoins each of said respective first side faces and said end faces.

7. A structural assembly comprising:
four structural members joined together by at least one clamp, first and second pairs of said members being joined in end-to-end relationship,
each member having first and second side faces and an end face extending therebetween,
a first member of said first pair and a first member of said second pair having first side faces in abutment, and a second member of said first pair and a second member of said second pair having first side faces in abutment,
each of said end faces having a longitudinally extending groove therein,
an entrance ramp in each member adjoining the end face and one wall of the groove,
a gripping ramp formed adjacent the inner end of each groove, each gripping ramp extending from said one groove wall in a direction away from the remainder of the groove,
said grooves in each pair of members opening toward each other having respective said one walls in alignment,
said clamp having a web having two back-to-back faces, a plurality of pairs of resilient opposing first side legs extending from opposite edges of said web in one direction, each pair of first legs and said web defining first channels in cross section,
a plurality of pairs of resilient opposing second side legs extending from opposite edges of said web in an opposite direction to said one direction, each pair of second legs and said web defining second channels in cross section,
each leg having a returning lip adacent its outer end, each lip having a curved outer face and an edge directed toward said web, and
one face of said web being in abutment with end faces between respective said entrance ramps of said first members of said first and second pairs of members,
the other face of said web being in abutment with end faces between respective said entrance ramps of said second members of said first and second pairs of members,
said pairs of said first side legs extending along respective said one walls of said grooves in said first members of said first and second pairs of members,
said pairs of said second side legs extending along respective said one walls of said grooves in said second members of said first and second pairs of members each of said edges of said lips being in gripping contact with said respective gripping ramps of said members.

8. A structural assembly comprising:
a structural member having a side face, an end face and a third face,
said end face extending between said side face and said third face, said third face being opposite said side face,
a longitudinal groove in said third face adjacent said end face,
a wall of said groove nearest the end face defining a gripping ramp for a clamp,
an entrance ramp for a clamp adjoining said third face and said end face,
a clamp engaged with said side, end and third faces and said groove,
said clamp having a web, at least one pair of resilient opposing side legs extending from opposite edges of said web, each pair of side legs and said web defining channels in cross section,
each side leg extending from one of said opposite edges having a returning lip adjacent its outer end,
each lip having a curved outer face and an edge directed toward said web, one face of said web being in contact with said end face of said member, each side leg extending from said one opposite edge of said web extending along said third face, each lip edge being in gripping contact with said gripping ramp, said side legs extending from the other of said opposite edges being in gripping contact with said side face, a plurality of resilient hook forming legs extending outwardly in the plane of said web from said other opposite edge thereof, said hook forming legs having a return bend at an acute angle thereto in the direction of the outer ends of the side legs and forming a hook for attachment to a support member, and a support member engaged with the ends of said hook forming legs, said support member having an upwardly extending member having at its lower end a downwardly opening generally V-shaped member, the lower ends of the V legs extending inwardly and slightly downwardly and being spaced from each other enough to permit said hooks to be snapped therebetween into the V opening, the V leg ends having an inner slightly downwardly extending surface to receive and support the ends of the hooks.

9. A structural assembly comprising:

a double wall structure having four members joined together in two pairs in end-to-end relationship, said four members being joined by at least one clamp, each member having two side faces and an end face extending therebetween, a longitudinal groove in one side face of each member, a wall of each groove nearest the end face defining a gripping ramp for said clamp, an entrance ramp in each member adjoining the end face and the side face having the groove, said members being in allochiral relationship, said clamp having a web having two back-to-back faces, laterally spaced resilient legs extending in two opposite directions from laterally spaced edges of said web adjacent a first lateral end thereof defining first pairs of back-to-back clamp channels in cross section, laterally spaced resilient legs extending in two opposite directions from laterally spaced edges of said web adjacent a second lateral end thereof opposite said first end defining second pairs of back-to-back clamp channels in cross section, said first pairs of clamp channels being in clamping engagement with one of said two pairs of members, said second pairs of clamp channels being in clamping engagement with the other of said two pairs of members, said web faces within said channels being in contact with end faces on said respective pairs of members, legs extending in opposite directions from one edge adjacent said first web end and legs extending in opposite directions from a corresponding edge adjacent said second web end, each having a returning lip adjacent its outer end, each lip having a curved outer face and an edge directed toward and in gripping contact with one of the respective gripping ramps, said legs having said lip extending along respective side faces having a groove, the others of said legs being in gripping contact with other respective side faces.

10. A clamp for joining structuural members:

a clamp web having two back-to-back faces, laterally spaced resilient legs extending in two opposite directions from laterally spaced edges of said web adjacent a first lateral end thereof defining first pairs of back-to-back clamp channels in cross section, laterally spaced resilient legs extending in two opposite directions from laterally spaced edges of said web adjacent a second lateral end thereof opposite said first end defining second pairs of back-to-back clamp channels in cross section, legs extending in opposite directions from one edge adjacent said first web end and legs extending in opposite directions from a corresponding edge adjacent said second web end, each having a returning lip adjacent its outer end, each lip having a curved outer face and an edge directed toward its respective clamp channel, the others of said legs having a laterally outwardly bend at their outer ends.

11. A clamp for joining structural members, said clamps comprising:

a flat web having a plurality of pairs of opposing side legs extending from opposite edges thereof and each pair defining a channel in cross section, one leg of each pair extending from one of said opposite edges having a returning lip adjacent its outer end, each lip having a curved outer face and having an edge directed toward said web, and a plurality of hook legs extending outwardly in the plane of said web from said other opposite edge of said web, said hook legs having a return bend at an acute angle thereto in the direction of the outer ends of said opposing legs and forming a hook for attachment to support member.

12. A clamp for joining structural members, said clamp comprising:

a flat web having a plurality of first pairs of opposing side legs extending from opposite edges thereof, each first pair extending in one direction and defining a channel in cross section, and second pairs of opposing legs extending in an opposite direction to said one direction from said opposite edges of said web, each of said legs extending from one of said opposite edges having a returning lip adjacent its outer end, each lip having a curved outer face and having an edge directed toward said web.

* * * * *